United States Patent
Yoon et al.

(10) Patent No.: US 11,201,379 B2
(45) Date of Patent: Dec. 14, 2021

(54) SECONDARY BATTERY HAVING FILLING VALVE

(71) Applicant: LG CHEM, LTD., Seoul (KR)

(72) Inventors: Jong Keon Yoon, Daejeon (KR); Dae Soo Kim, Daejeon (KR); Dong Kyu Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 597 days.

(21) Appl. No.: 15/979,978

(22) Filed: May 15, 2018

(65) Prior Publication Data
US 2018/0366718 A1    Dec. 20, 2018

(30) Foreign Application Priority Data
Jun. 15, 2017    (KR) .................... 10-2017-0075895

(51) Int. Cl.
| | | |
|---|---|---|
| H01M 2/02 | (2006.01) | |
| H01M 2/36 | (2006.01) | |
| H01M 50/636 | (2021.01) | |
| F16K 15/18 | (2006.01) | |
| F16K 31/50 | (2006.01) | |
| H01M 50/10 | (2021.01) | |
| H01M 50/60 | (2021.01) | |

(Continued)

(52) U.S. Cl.
CPC .......... H01M 50/636 (2021.01); F16K 15/18 (2013.01); F16K 31/50 (2013.01); H01M 50/10 (2021.01); H01M 50/60 (2021.01); H01M 50/691 (2021.01); F16K 15/00 (2013.01); H01M 2220/10 (2013.01)

(58) Field of Classification Search
None
See application file for complete search history.

(56) References Cited

U.S. PATENT DOCUMENTS

| 7,150,416 B2 | 12/2006 | Martin et al. |
| 8,752,573 B2 | 6/2014 | Nishimura et al. |

(Continued)

FOREIGN PATENT DOCUMENTS

| CN | 1946967 A | 4/2007 |
| CN | 102055010 A | 5/2011 |

(Continued)

OTHER PUBLICATIONS

European Search Report for Appl. No. 18172303.2 dated Jul. 18, 2018.

*Primary Examiner* — Zhongqing Wei
(74) *Attorney, Agent, or Firm* — Birch, Stewart, Kolasch & Birch, LLP

(57) ABSTRACT

The secondary battery includes a body part provided in a pillar shape on an outer wall and including a passage, through which the electrolyte flows, therein, a pin switch extending in a longitudinal direction of the body part, wherein, when a pressure is applied to an end of the pin switch, the pin switch linearly moves toward the inside, and when the pressure is removed, the pin switch linearly moves toward the outside, a manipulation part to move in a direction that is parallel to the pin switch, a pressure apply part protruding from a central portion of the manipulation part to apply a pressure an end of the pin switch, and a switching part disposed on the other end of the pin switch to open and close the passage.

17 Claims, 8 Drawing Sheets

(51) Int. Cl.
*H01M 50/691* (2021.01)
*F16K 15/00* (2006.01)

(56) References Cited

U.S. PATENT DOCUMENTS

| | | | |
|---|---|---|---|
| 2004/0101746 A1* | 5/2004 | Ota | H01M 50/531 |
| | | | 429/161 |
| 2006/0144954 A1 | 7/2006 | Martin et al. | |
| 2011/0108134 A1* | 5/2011 | Nishimura | H01M 50/636 |
| | | | 137/260 |
| 2016/0257082 A1 | 9/2016 | Ragan et al. | |
| 2018/0366718 A1 | 12/2018 | Yoon et al. | |

FOREIGN PATENT DOCUMENTS

| | | | |
|---|---|---|---|
| CN | 208400935 U | | 1/2019 |
| JP | 49-40493 Y1 | | 11/1974 |
| JP | 11-149937 A | | 6/1999 |
| JP | 2000-48773 A | | 2/2000 |
| JP | 2011-100634 A | | 5/2011 |
| KR | 10-2016-0047217 A | | 5/2016 |
| KR | 20160047217 A | * | 5/2016 |

* cited by examiner

SECONDARY BATTERY HAVING FILLING VALVE

CROSS-REFERENCE TO RELATED APPLICATIONS

The present application claims the benefit of the priority of Korean Patent Application No. 10-2017-0075895, filed on Jun. 15, 2017, which is hereby incorporated by reference in its entirety.

BACKGROUND OF THE INVENTION

Field of the Invention

The present invention relates to a secondary battery, and more particularly, to a secondary battery which is capable of minimizing exposure of an internal structure and an electrolyte of the battery to air while re-injecting the electrolyte.

Description of the Related Art

Batteries (cells) that generate electric energy through physical or chemical reaction to supply the generated electric energy to the outside are used when AC power to be supplied to the building is not obtained, or DC power is required according to the living environments surrounded by various electronic devices.

Among such batteries, primary batteries and secondary batteries, which are chemical cells using chemical reaction, are generally used. The primary batteries are consumable cells which are collectively referred to as dry cells. On the other hand, a secondary battery is a rechargeable battery that is manufactured by using a material in which oxidation and reduction processes between current and a material are capable of being repeated many times. That is, when the reduction reaction to the material is performed by the current, power is charged. When the oxidation reaction to the material is performed by the current, power is discharged. Such charging-discharging are repeatedly performed to generate electricity.

Particularly, a lithium battery using lithium (Li) may be classified into a lithium metal battery, a lithium ion battery, and a lithium secondary battery according to types of electrolyte.

Here, since the lithium secondary battery has a solid or gel-type electrolyte, even if the battery is broken due to an unexpected accident, the electrolyte does not leak to the outside. Thus, since there is no possibility of ignition or explosion, stability may be secured, and energy efficiency may be improved.

Also, such a lithium secondary battery may not require a firm metal exterior and be manufactured in various sizes and shapes according to a use thereof. For example, the lithium secondary battery may have a thickness of 3 mm or less and a weight that is reduced by 30% or more. Thus, the lithium secondary battery may be mass-produced and manufactured in large size. For this reason, the lithium secondary battery has been commercialized at present and is being used in various fields.

In such a lithium secondary battery, crystal structures of a positive electrode and a negative electrode are collapsed due to a side reaction between a surface of the electrode and the electrolyte while the charging/discharging cycle is repeated, and the electrolyte is depleted to reduce the lifetime of the battery. Particularly, the lithium ions are deteriorated in mobility due to the depletion of the electrolyte to cause an increase in internal resistance, resulting in sudden deterioration in performance of the cell.

In recent years, various methods have been proposed which are capable of reducing the deterioration in performance of the secondary battery cell and also prolonging the service life by additionally injecting an electrolyte solution into the secondary battery cell. Representatively, there is a method of injecting the solution by using a syringe after opening an outer case of the cell through a physical method and then re-sealing the opened portion. However, in this method, the internal structure of the battery may be exposed to air to cause the oxidation of the electrode and the degeneration of the electrolyte. Thus, there has been a limitation that additional costs for preventing this phenomenon are required.

As another method, there is a method of sticking a needle of a syringe into a material such as rubber of a polymer material to re-inject the solution and then seal the stuck portion by itself. However, this method has a limitation that the number of times of re-injection is limited because the strength of the material is weakened by forming a hole at the portion that is stuck by the needle of the syringe once.

SUMMARY OF THE INVENTION

An aspect of the present invention provides a secondary battery which is capable of re-injecting an electrolyte into the secondary battery cell and minimizing exposure of an internal structure and the electrolyte of the battery to air.

The objects of the present invention are not limited to the aforementioned object, but other objects not described herein will be clearly understood by those skilled in the art from descriptions below.

According to another aspect of the present invention, there is provided a secondary battery includes: a body part provided in a pillar shape on an outer wall that surrounds an accommodation space in which an electrode assembly and an electrolyte are accommodated and including a passage, through which the electrolyte flows, therein; a pin switch extending in a longitudinal direction of the body part within the body part, wherein, when a pressure is applied to an end of the pin switch, the pin switch linearly moves toward the inside in which the accommodation space is defined, and when the pressure is removed, the pin switch linearly moves toward the outside; a manipulation part coupled to an outer circumferential surface of the body part to move in a direction that is parallel to the linear movement of the pin switch; a pressure apply part protruding from a central portion of the manipulation part to apply a pressure an end of the pin switch according to the movement of the manipulation part; and a switching part disposed on the other end of the pin switch to open the passage when the pin switch linearly moves toward the inside and close the passage when the pin switch linearly moves toward the outside.

The secondary battery may further include an elastic part having elasticity and providing a restoring force to the pin switch when the pressure is removed.

The elastic part may be lengthily disposed in a spiral shape according to a pillar of the pin switch.

The secondary battery may further include a cover part surrounding the pillar of the pin switch and the elastic part to extend in a direction of the pillar of the pin switch.

The cover part may have has corrosion resistance.

The secondary battery may further include a support coupled to an inner circumferential surface of the body part and including the passage therein.

The pin switch may pass through the support and is inserted into the support, and an end of the pin switch may protrude from the support to the outside.

The secondary battery may further include an elastic part having elasticity to provide a restoring force to the pin switch when the pressure is removed, wherein the elastic part may connect the support to the pin switch.

The secondary battery may further include first and second inflow and outflow holes through which the electrolyte is introduced into and discharged from the passage, the first and second inflow and outflow holes being respectively provided in an inner end and an outer end of the support.

The switching part may open or close the first inflow and outflow hole.

The support may be screw-coupled to the inner circumferential surface of the body part.

The manipulation part may include a third inflow and outflow hole through which the electrolyte is introduced into and discharged from the passage.

The body part may protrude outward.

The secondary battery may further include a case surrounding the outside of the outer wall.

The body part may be recessed into the outer wall of one side of the case.

Particularities of other embodiments are included in the detailed description and drawings.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
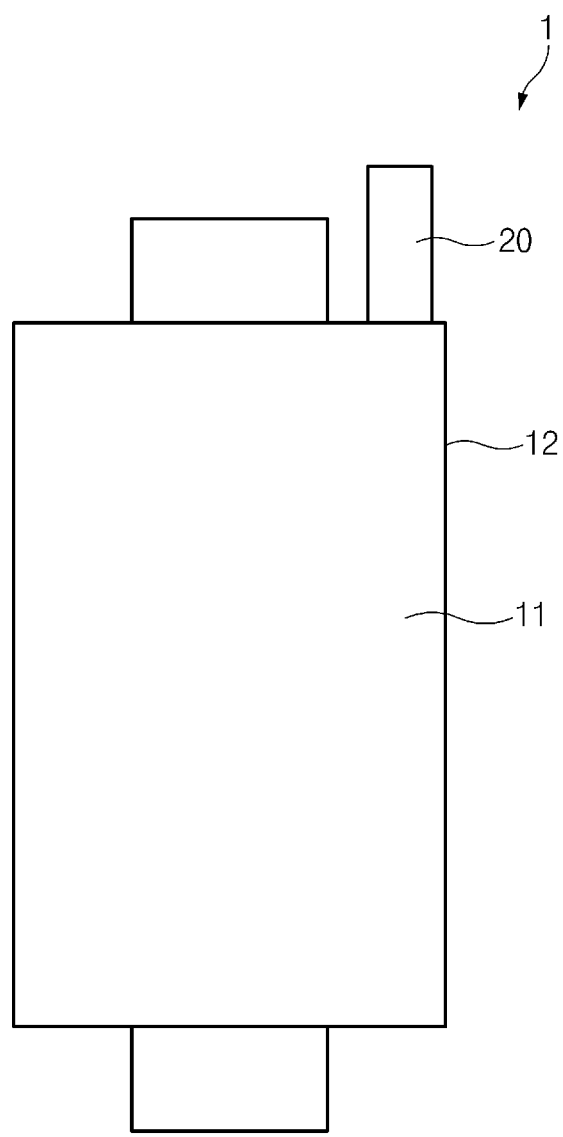
FIG. 1 is a schematic view of a secondary battery according to an embodiment of the present invention.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the inventive concept. In this specification, the terms of a singular form may include plural forms unless specifically mentioned. The meaning of "comprises" and/or "comprising" does not exclude other components besides a mentioned component.

Hereinafter, preferred embodiments will be described in detail with reference to the accompanying drawings.

FIG. 1 is a schematic view of a secondary battery 1 according to an embodiment of the present invention.

Referring to FIG. 1, the secondary battery 1 according to an embodiment of the present invention includes an accommodation space 11 in which an electrode assembly and an electrolyte are accommodated, an outer wall 12 surrounding the accommodation space 11, and a valve 20 through which the electrolyte is injected into the accommodation space 11.

The outer wall 12 surrounds the accommodation space 11 of the secondary battery 1 to prevent the electrode assembly and the electrolyte from being separated to the outside. If the secondary battery 1 is provided as a pouch type secondary battery, the outer wall 12 may be made of a soft material to be easily deformable by an external force. Alternatively, if the secondary battery 1 is provided as a prismatic or can type secondary battery, the outer wall 12 may be made of a hard material, and thus, a strong external force for deforming the shape of the outer wall 12 may be required.

The valve 20 is disposed on the outer wall 12 to connect the accommodation space 11 to the outside. Also, the electrolyte may be injected into the accommodation space 11 from the outside while preventing the electrolyte accommodated in the accommodation space 11 from leaking. The valve 20 will be described below in detail.

Figure 2:
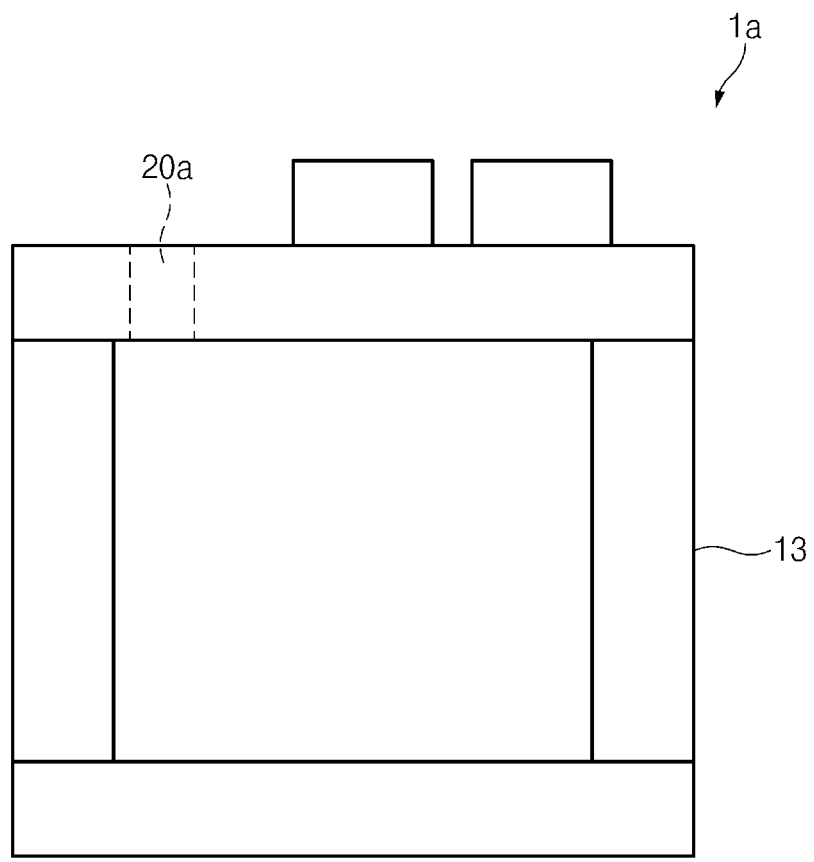
FIG. 2 is a schematic view of the secondary battery including a case according to an embodiment of the prevent invention.

FIG. 2 is a schematic view of the secondary battery 1 including a case 13 according to an embodiment of the prevent invention.

As illustrated in FIG. 2, the secondary battery 1 according to an embodiment of the present invention may further include the case 13 surrounding the outside of the outer wall 12. In this case, the valve 20 may be formed to protrude to the outside of the case 13, but it is preferable that the valve is formed to be recessed into one side of the case 13. As the valve 20 does not protrude, an outer appearance of the secondary battery 1 may be elegant to provide a sense of beauty to the user. Furthermore, possibility of collision of the valve 20 from the outside may be reduced to prevent the valve 20 from being damaged. However, an embodiment of the present invention is not limited thereto. Although the case 13 is not provided, the valve may be formed in various methods, for example, the valve 20 may be formed to be recessed into the outer wall 12.

Figure 3:
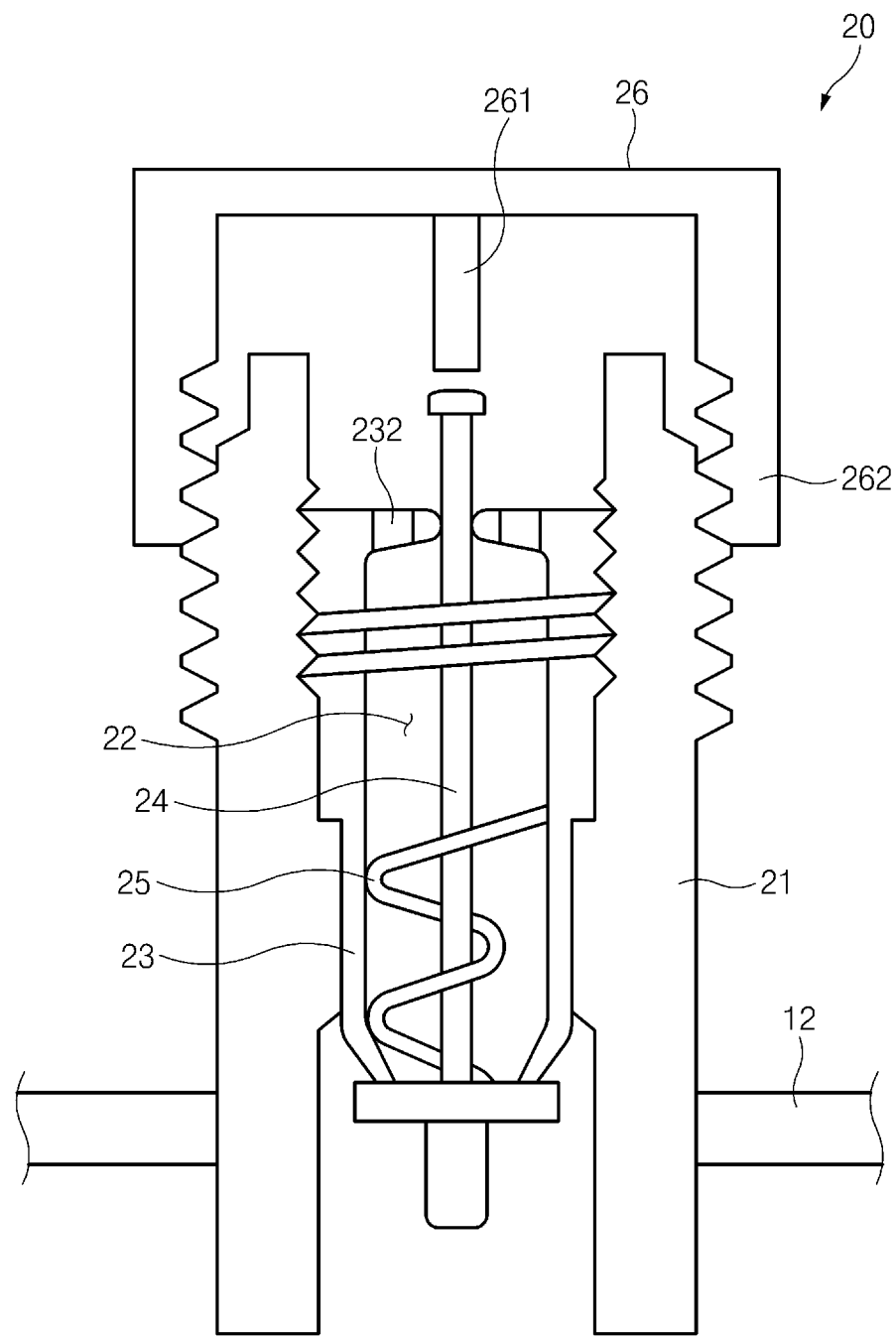
FIG. 3 is a view illustrating a structure of a valve according to an embodiment of the present invention.

FIG. 3 is a view illustrating a structure of the valve 20 according to an embodiment of the present invention.

As illustrated in FIG. 3, the valve 20 according to an embodiment of the present invention adjusts a flow of the electrolyte. Also, the valve 20 includes a body part 21 disposed on the outer wall 12 of the secondary battery 1, a support 23 coupled to an inner circumferential surface of the body part 21, a pin switch 24 inserted to pass through the support 23, and a manipulation part 26 applying a pressure to the pin switch 24.

The body part 21 has a pillar shape 241 and is disposed on the outer wall 12 of the secondary battery 1. However, the body part 21 may protrude from the outer wall 12, but is not limited thereto. For example, the body part 21 may be recessed into the outer wall 12. That is, the body part 21 may be variously formed as long as the body part 21 is capable of adjusting the flow of the electrolyte.

The support 23 is coupled to the inner circumferential surface of the body part 21. Here, it is preferable that the support 23 is screw-coupled, but is not limited thereto. For example, the support 23 may be coupled in various manners such as bolt coupling, rivet coupling, and the like. A passage 22 through which the electrolyte flows may be provided in the support 23. Also, inflow and outflow holes through the electrolyte is introduced into and discharged from the passage may be defined in both ends of the support 23, respectively. According to an embodiment of the present invention, since the inflow and outflow holes are easily opened and closed by using the pin switch 24, exposure of the electrolyte to air may be minimized. Although the passage 22 is provided in the support 23, if the support 23 is not separately provided but is integrated with the body part 21, the passage 22 may be provided in the body part 21.

Figure 4:
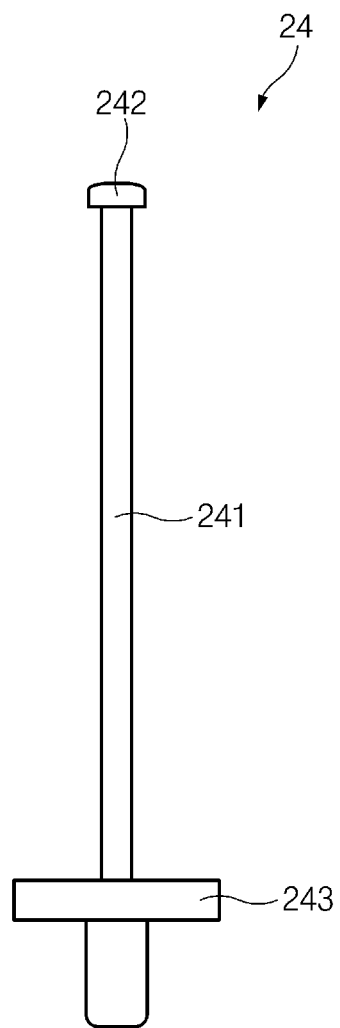
FIG. 4 is a view illustrating a structure of a pin switch according to an embodiment of the present invention.

FIG. 4 is a view illustrating a structure of the pin switch 24 according to an embodiment of the present invention.

As illustrated in FIG. 4, a pin switch 24 device according to an embodiment of the present invention includes a pillar 241, a head 242, and a switching part 243.

The pillar 241 of the pin switch 24 lengthily extends in a longitudinal direction of the body part 21. Also, the pillar 241 passes through the support 23 and is disposed in the passage 22. The head 242 and the switching part 243 may be disposed on both the ends of the pillar 241, respectively.

The head 242 is disposed on an outer end of the pin switch 24. That is, the head 242 is disposed on an end, which is directed to the outside of the secondary battery 1, of both the ends of the pin switch 24. The head 242 protrudes from the pillar 241 in a radius direction of the outer circumferential surface. Thus, the head 242 does not pass through the support 23 through which the pillar 241 of the pin switch 24 passes. That is, the head 242 may prevent the entire pin switch 24 from being inserted into the support 23, and thus, the elastic part 25 may allow the pin switch 24 to return to its original position. The manipulation part 26 may apply a pressure to the head 242 to allow the pin switch 24 to linearly move to the inside of the secondary battery 1. The elastic part 25 and the manipulation part 26 will be described below in detail.

The switching part 243 is disposed on an inner end of the pin switch 24. That is, the head 242 is disposed on an end, which is directed to the inside of the secondary battery 1, of both the ends of the pin switch 24. The switching part 243 also protrudes from the pillar 241 in the radius direction of the outer circumferential surface. Also, when the manipulation part applies a pressure to the head 242, the switching part 243 opens the inflow and outflow holes of the passage 22. When the pressure is removed, the switching part 243 closes the inflow and outflow holes of the passage 22.

Figure 5:
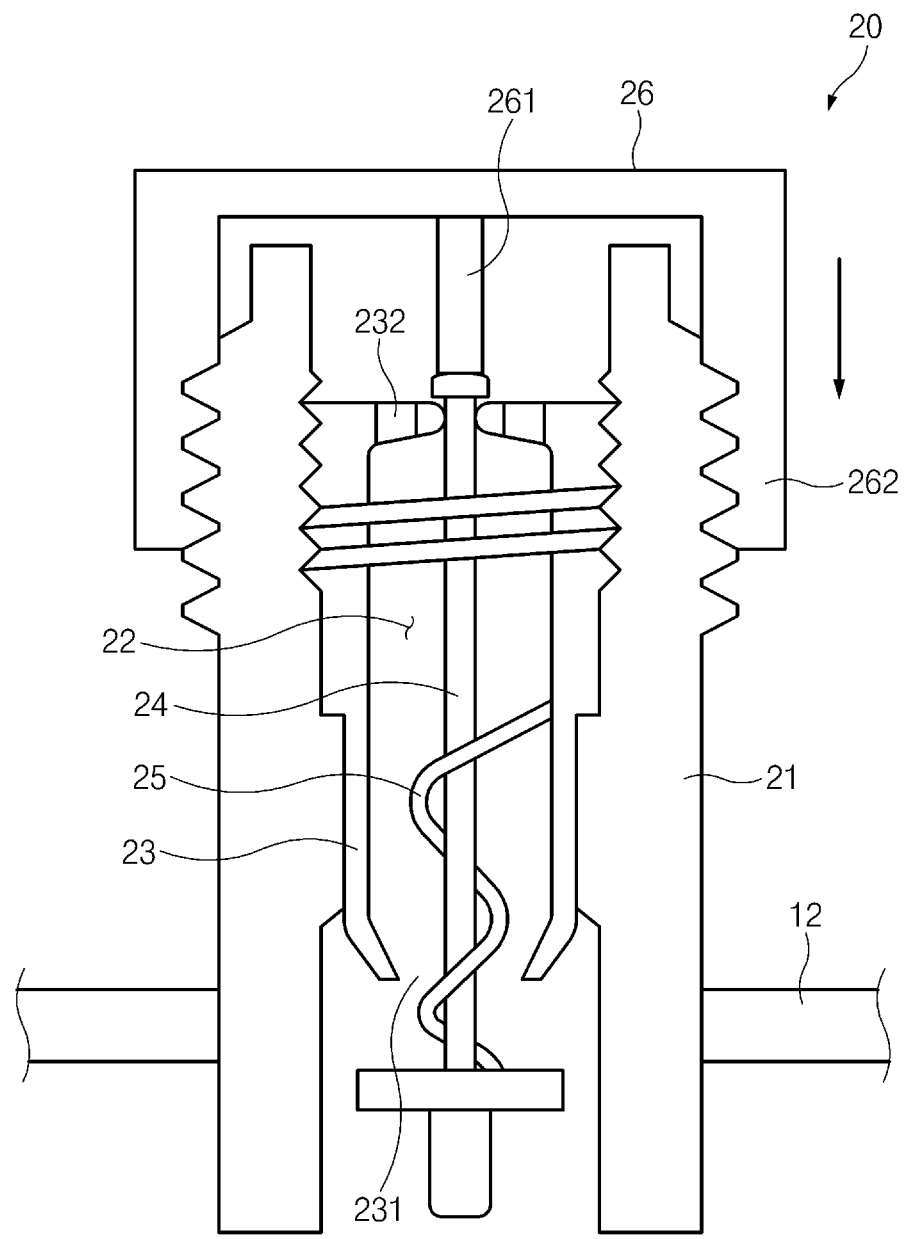
FIG. 5 is a view illustrating a state in which the valve of FIG. 3 is opened by a manipulation part according to an embodiment of the present invention.

FIG. 5 is a view illustrating a state in which the manipulation part 26 opens the valve 20 of FIG. 3 according to an embodiment of the present invention.

The manipulation part 26 applies a pressure to the pin switch 24. As illustrated in FIGS. 3 and 5, the manipulation part 26 includes a body 262 screw-coupled to the outer circumferential surface of the body part 21 and a pressure apply part 261 protruding from a central portion toward the body part 21.

The body 262 of the manipulation part 26 is coupled to cover the outer circumferential surface and an upper portion of the body part 21. If the manipulation part 26 is not provided, the pin switch 24 may protrude to the outside of the support 23 and thus be exposed to the risk of collision. That is, the pin switch 24 may be easily impacted from the outside and may be easily broken by this impact, or the inflow and outflow holes may be opened. However, the manipulation part 26 may cover an upper portion of the body part 26 to prevent the pin switch 24 from being damaged or prevent the inflow and outflow holes from opened.

The pressure apply part 261 protrudes from the central portion of the manipulation part 26 toward the pin switch 24. Also, when the user manipulates the manipulation part 26 to allow the manipulation part 26 to move, a pressure is applied to the head 242 disposed on an outer end of the pin switch 24. Thus, the pin switch 24 may linearly move toward the inside of the secondary battery 1.

The body 262 of the manipulation part 26 is screw-coupled to the outer circumferential surface of the body part 21. Thus, the body part 21 may be disposed on the outer circumferential surface of the body part 21 to serve as a screw thread, and a screw may be disposed on an inner circumferential surface of the body to serve as a female screw. For example, when the manipulation part 26 rotates in a clockwise direction, since the body 262 and the body part 21 are fastened with respect to each other in a screw principle, the body 262 moves toward the inside of the secondary battery 1. Thus, the pressure apply part 261 applies a pressure to the head 242 of the pin switch 24 to allow the pin switch 24 to linearly move toward the inside of the secondary battery 1 so that the switching part 243 opens the inflow and outflow holes. On the other hand, when the manipulation part 26 rotates in a counterclockwise direction, since the coupling between the body 262 and the body part 21 is released with respect to each other, the body 262 moves to be away from the secondary battery 1. Thus, the pressure applied to the head of the pin switch 24 by the pressure apply part 261 may be gradually reduced so that the pin switch 24 returns to its original position to allow the switching part 243 to close the inflow and outflow holes.

The valve 20 of the secondary battery 1 according to an embodiment of the present invention further includes an elastic part 25. The elastic part 25 connects the pin switch 24 to the support 23 or connects the pin switch 24 to the body part 21. Also, when the pressure is removed, a restoring force is provided to allow the pin switch 24, which has linearly moved, to return to its original position. The elastic part 25 may be made of a metal having elasticity such as a spring and may have a shape that lengthily extends in an axial direction while forming a circle having a predetermined size, for example, a spiral shape. However, the present invention is not limited thereto. For example, the elastic part 25 may have various sizes and shape as lone as the elastic part 25 generates the elastic force to provide the elastic force to the pin switch 24.

The restoring force may be an actual elastic force generated from the elastic part 25. That is, when the elastic part 25 is deformed while the pin switch 24 linearly moves, the elastic force is generated in proportion to the deformed degree and an elastic modulus. However, if the valve 20 of the secondary battery 1 does not include the elastic part 25, the restoring force may be provided in a different manner so that the pin switch 24 returns to its original position. For example, a magnet may be attached to the support 23 and the pin switch 24 to generate a magnetic force and then generate electricity and thereby to generate an elastic force. That is, if the pin switch 24 returns to its original position when the pressure is removed, various methods may be used without limitation.

As illustrated in FIGS. 3 and 5, both sides of the passage 22 are opened so that first and second inflow and outflow holes 232 are provided on both sides of the support 23. The electrolyte may be introduced and discharged through the first and second inflow and outflow holes 232 to flow along the passage 22. The first inflow and outflow hole 231 is defined in an inner end of the support 23. That is, the first and second hole 231 is defined in an end of both the ends of the support 23, which faces the inside of the secondary battery 1. The switching part 243 of the pin switch 24 opens and closes the first inflow and outflow hole 231 according to the pressure is applied thereto or removed therefrom. The first inflow and outflow holes 231 may have a diameter less than that of the switching part 243. For this, the inner end of the support 23 extends while having a diameter that gradually decreases toward the inside of the secondary battery 1. When the switching part 243 closes the first inflow and outflow hole 231, the switching part 243 may come into close contact with the inner end of the support 23. Thus, the passage 22 is closed to prevent the electrolyte from leaking through the first and second inflow and outflow hole 231.

On the other hand, the second inflow and outflow holes 232 are defined in an outer end of the support 23. That is, the first and second hole 232 is defined in an end of both the ends of the support 23, which faces the outside of the secondary battery 1. The second inflow and outflow hole 232 is always opened regardless of the movement of the pin switch 24. Thus, the electrolyte may be introduced and discharged at any time through the second inflow and outflow hole 232. However, as described above, when the first inflow and outflow hole 231 is closed, the electrolyte may not be injected into the accommodation space 11 defined in the secondary battery 1 even through the electrolyte flows along the passage 22 through the second inflow and outflow hole 232.

Figure 6:
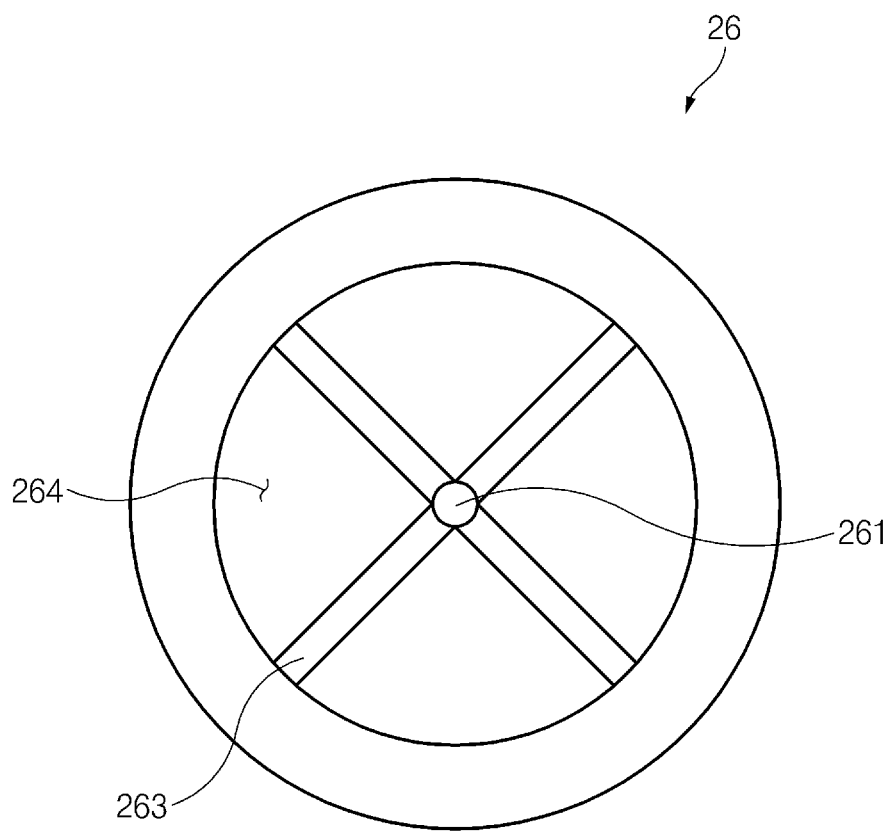
FIG. 6 is a plan view of the manipulation part according to an embodiment of the present invention.

FIG. 6 is a plan view illustrating the manipulation part 26 according to an embodiment of the present invention.

As illustrated in FIG. 6, the manipulation part 26 includes a third inflow and outflow hole 264 in a top surface thereof. According to an embodiment of the present invention, even though the electrolyte in the secondary battery 1 is depleted, the electrolyte may be separately injected and supplemented by connecting an electrolyte injector. However, the manipulation part 26 may be disposed on the upper portion of the body part 21 to protect the pin switch 24. It is preferable that the manipulation part is not separated from the body part 21. Thus, the electrolyte injector may not be directly connected to the body part 21 but be connected to the manipulation part.

After the electrolyte injector is connected to the manipulation part, if the user manipulates the manipulation part 26 to open the first inflow and outflow hole 231, the electrolyte is discharged from the electrolyte injector. Also, when the electrolyte is introduced into the valve 20 through the third inflow and outflow hole 264 of the manipulation part 26, the electrolyte sequentially passes through the second inflow and outflow hole 232 and the first inflow and outflow hole 231 and then is injected into the accommodation space 11. Thus, the electrolyte of the secondary battery 1 may be supplemented.

The manipulation part 26 further include a connection part 263 connecting the body 262 to the pressure apply part 261. The pressure apply part 261 of the manipulation part 26 is disposed at a central portion of the manipulation part 26. However, since the third inflow and outflow hole 264 is defined in the top surface of the manipulation part 26, the connection part 263 connects the pressure apply part 261 to the body 262. As a surface area of the top surface of the manipulation part 26, which is occupied by the connection part 263, decreases, the third inflow and outflow hole 264 may increase in surface area. Thus, the electrolyte may be more easily injected. However, as the injection pressure of the electrolyte increases, possibility of damage of the connection part 263 may increase. On the other hand, as the surface area of the top surface of the manipulation part 26, which is occupied by the connection part 263, increases, the possibility of damage of the connection part 263 may decrease. However, since the third inflow and outflow hole 264 decreases in surface area, it is difficult to inject the electrolyte. Thus, optimal surface areas of the connection part 263 and the third inflow and outflow hole 264, in which the electrolyte is easily injected while the possibility of damage of the connection part 263 is reduced, may be experimentally obtained.

FIG. 6 illustrates the configuration in which the body 262 and the pressure apply part 261 are connected to each other through the connection part. However, the present invention is not limited thereto. For example, the body 262 and the pressure apply part 261 may be integrated with each other without the separate connection part 263. In this case, the third inflow and outflow hole 264 may be provided by separately performing a punching operation on the top surface of the manipulation part 26 or by intentionally obstructing the injection of casting.

Figure 7:
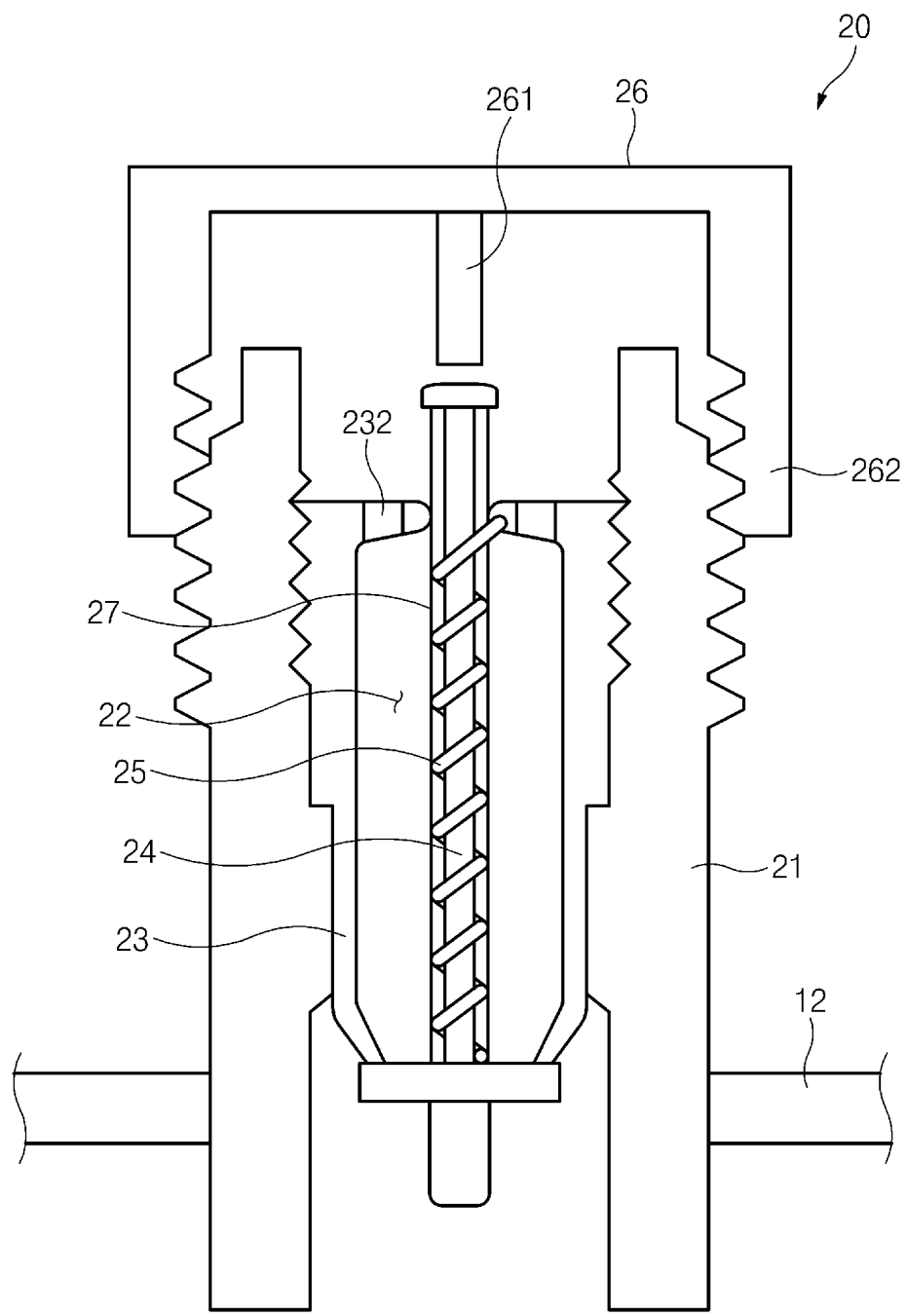
FIG. 7 is a view illustrating a structure of a valve according to another embodiment of the present invention.

FIG. 7 is a view illustrating a structure of a valve 20 according to another embodiment of the present invention.

The valve 20 of a secondary battery 1 according to another embodiment of the present invention further includes a cover part 27. Hereinafter, duplicated description with those of the secondary battery 1 according to the abovementioned embodiment of the present invention will be omitted. The omitted contents may be easily deducted from the contents of the secondary battery 1 according to the abovementioned embodiment of the present invention by the person skilled in the art. Thus, although a portion of the contents of the secondary battery 1 according to another embodiment of the present invention is omitted, the person skilled in the art may easily carry out the features.

As described, an elastic part 25 is spirally disposed around a pillar 241 of a pin switch 24. As illustrated in FIG. 7, the cover part 27 covers an elastic part 25 and the pillar 241 of the pin switch 24 to lengthily extend in a longitudinal direction of the pillar 241 of the pin switch 24.

The cover part 27 may be made of a corrosion resistant material, for example, a polymer. In general, the electrolyte accelerates oxidation and reduction reactions of a positive electrode and a negative electrode of the secondary battery 1 and thus is resistant to corrosion. However, according to an embodiment of the present invention, since the elastic part 25 is exposed within a passage 22, when the electrolyte is injected, the elastic part 25 may come into contact with the electrolyte as it is. However, as described above, the elastic part 25 is made of a metal material having elasticity. Thus, the elastic part 25 may be easily corroded by the electrolyte having the strong corrosive property to reduce lifespan and increase costs and effects for replacement.

However, in the secondary battery 1 according to another embodiment of the present invention, the cover part 27 having the high corrosion resistance covers the elastic part 25. Thus, the contact with the elastic part 25 may be prevented to increase the lifespan of the elastic part 25.

Figure 8:
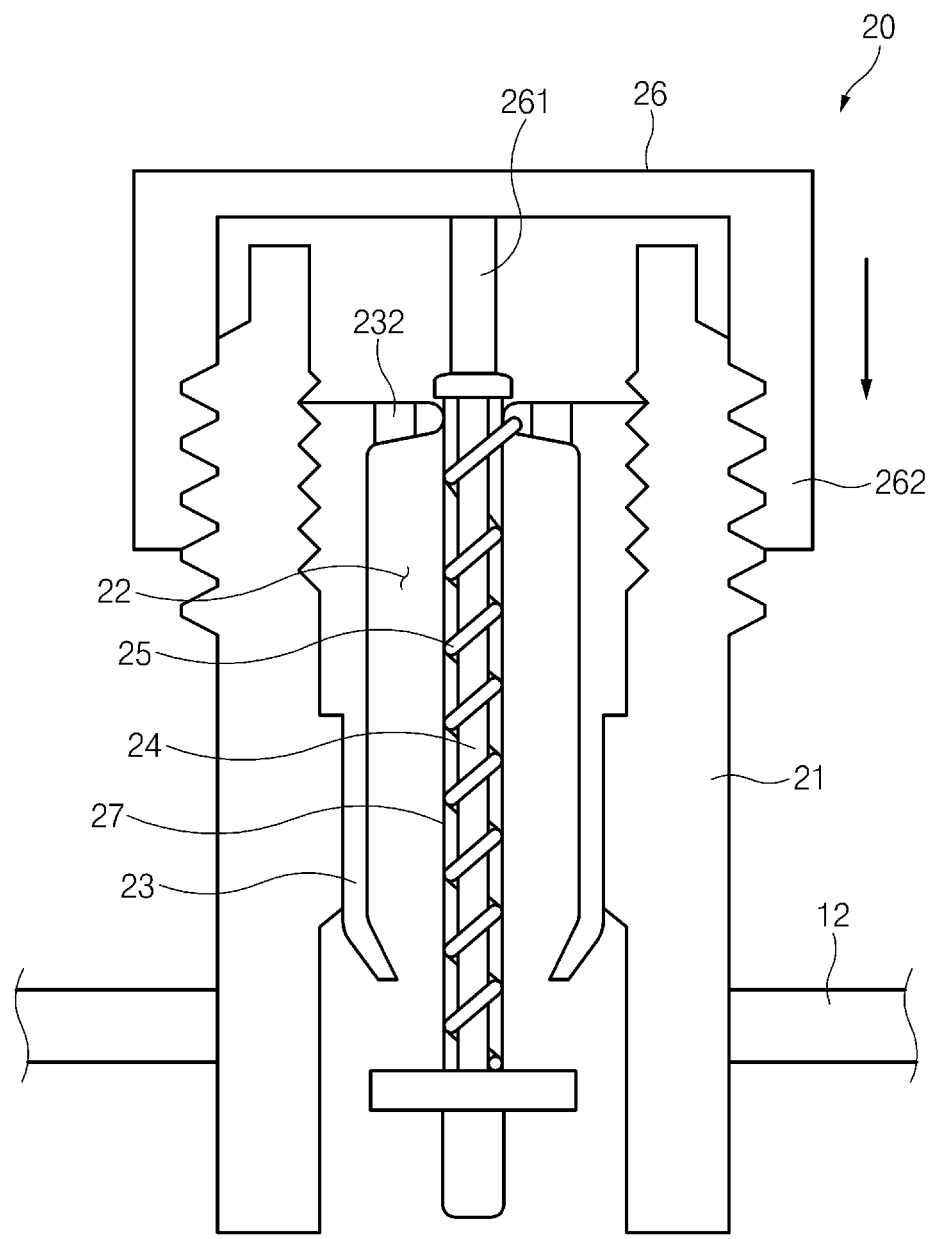
FIG. 8 is a view illustrating a state in which the valve of FIG. 7 is opened by a manipulation part according to another embodiment of the present invention.

FIG. 8 is a view illustrating a state in which the manipulation part 26 opens the valve 20 of FIG. 7 according to another embodiment of the present invention.

The cover part 27 covers the elastic part 25 and extends from a head 242 of the pin switch 24 to a switching part 243. Also, the cover part 27 seals the contact portion between the head 242 of the pin switch 24 and the switching part 243. Thus, the electrolyte may not be introduced into the cover part 27 to prevent the electrolyte from coming into contact with the elastic part 25. As illustrated in FIG. 8, even though the manipulation part 26 is manipulated, and thus, the pin switch linearly moves, the above-described feature is the same. Since the cover part 27 is disposed between the head 242 of the pin switch and the switching part 243, when a pressure is applied to the pin switch 24, and thus, the pin switch 24 moves, the head 242 and the switching part 243 may move together with the pin switch 24. Thus, even though the pin switch 24 linearly moves, the sealed state of the cover part 27 and the contact portion between the head 242 and the switching part 243 may be maintained.

However, to connect the elastic part 25 to a support 23, an end of the elastic part 25 may pass through the cover part 27 to protrude. In this case, the end of the elastic part 25 may come into contact with the electrolyte, and thus, the end of the elastic part 25 may be accelerated in corrosion. Thus, although not shown, the end of the elastic part 25 protruding bypassing through the cover part 27 may be covered by a separate member having high corrosion resistance. That is, according to another embodiment of the present invention, various methods may be used without limitation as long as the contact between the elastic part 25 and the electrolyte is prevented.

The embodiments of the present invention may have at least the following effects.

The electrolyte may be re-injected into the secondary battery cell by using a schrader valve without limitation in number, and also, the exposure of the internal structure and the electrolyte of the battery to the air may be minimized.

In addition, the manipulation part may be disposed on the upper portion of the valve to protect the pin switch of the schrader valve so that the pin switch is not subjected to a pressure even when a small impact is applied.

Also, the user may manipulate only the manipulation part to easily adjust the switching of the schrader valve.

The effects of the prevent invention are not limited by the aforementioned description, and thus, more varied effects are involved in this specification.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

What is claimed is:

1. A secondary battery comprising:
    a body part provided in a pillar shape on an outer wall that surrounds an accommodation space in which an electrode assembly and an electrolyte are accommodated and comprising a passage, through which the electrolyte flows, therein;
    a pin switch extending along a longitudinal axis of the body part within the body part, wherein, when a pressure is applied to a first end of the pin switch, the pin switch linearly moves along the longitudinal axis toward an inside of the outer wall in which the accommodation space is defined, and when the pressure is removed, the pin switch linearly moves along the longitudinal axis toward an outside of the outer wall;
    a manipulation part screw-coupled to an outer circumferential surface of the body part to move parallel to the linear movement of the pin switch when the manipulation part rotates with respect to the body part;
    a pressure apply part protruding from a central portion of the manipulation part to apply the pressure to the first end of the pin switch in response to movement of the manipulation part towards the body part and to remove the pressure from the first end of the pin switch in response to movement of the manipulation part away from the body part; and
    a switching part disposed on a second end of the pin switch opposite the first end to open the passage when the pin switch linearly moves toward the inside of the outer wall and to close the passage when the pin switch linearly moves toward the outside of the outer wall.

2. The secondary battery of claim 1, further comprising an elastic part having elasticity and providing a restoring force to the pin switch when the pressure is removed.

3. The secondary battery of claim 2, wherein the elastic part is lengthily disposed in a spiral shape according to a pillar of the pin switch.

4. The secondary battery of claim 3, further comprising a cover part surrounding the pillar of the pin switch and the elastic part to extend along a longitudinal axis of the pillar of the pin switch.

5. The secondary battery of claim 4, wherein the cover part has corrosion resistance.

6. The secondary battery of claim 1, further comprising a support coupled to an inner circumferential surface of the body part and comprising the passage therein.

7. The secondary battery of claim 6, wherein the pin switch passes through the support and is inserted into the support, and
    the first end of the pin switch protrudes from the support to the outside of the outer wall.

8. The secondary battery of claim 6, further comprising an elastic part having elasticity to provide a restoring force to the pin switch when the pressure is removed,
    wherein the elastic part connects the support to the pin switch.

9. The secondary battery of claim 6, further comprising first and second inflow and outflow holes through which the electrolyte is introduced into and discharged from the passage, the first and second inflow and outflow holes being respectively provided in an inner end and an outer end of the support.

10. The secondary battery of claim 9, wherein the switching part opens or closes the first inflow and outflow hole.

11. The secondary battery of claim 6, wherein the support is screw-coupled to the inner circumferential surface of the body part.

12. The secondary battery of claim 1, wherein the manipulation part comprises a third inflow and outflow hole through which the electrolyte is introduced into and discharged from the passage.

13. The secondary battery of claim 1, wherein the body part protrudes outward from the outer wall.

14. The secondary battery of claim 1, further comprising a case surrounding the outer wall.

15. The secondary battery of claim 14, wherein the body part is recessed into an outer wall of one side of the case.

16. A secondary battery comprising:
- a body part provided in a pillar shape on an outer wall that surrounds an accommodation space in which an electrode assembly and an electrolyte are accommodated and comprising a passage, through which the electrolyte flows, therein;
- a pin switch extending along a longitudinal axis of the body part within the body part, wherein, when a pressure is applied to a first end of the pin switch, the pin switch linearly moves along the longitudinal axis toward an inside of the outer wall in which the accommodation space is defined, and when the pressure is removed, the pin switch linearly moves along the longitudinal axis toward an outside of the outer wall;
- a manipulation part screw-coupled to an outer circumferential surface of the body part to move parallel to the linear movement of the pin switch when the manipulation part rotates with respect to the body part;
- a pressure apply part protruding from a central portion of the manipulation part to apply the pressure or remove the pressure to the first end of the pin switch in response to movement of the manipulation part, the pressure apply part being fixed to the manipulation part such that the pressure apply part does not move relative to the manipulation part; and
- a switching part disposed on a second end of the pin switch opposite the first end to open the passage when the pin switch linearly moves toward the inside of the outer wall and to close the passage when the pin switch linearly moves toward the outside of the outer wall.

17. The secondary battery according to claim 16, wherein the pressure apply part and the manipulation part are provided as a single, one piece member.

* * * * *